UNITED STATES PATENT OFFICE 2,462,337

PREPARATION OF UNSATURATED ACID ESTERS

Leon Shechter, East Orange, N. J., assignor to Bakelite Corporation, a corporation of New Jersey No Drawing. Application August 8, 1946, Serial No. 689,196

6 Claims. (Cl. 260—486)

In attempting the preparation of an ester from an unsaturated diene monoacid having conjugated ethylenic bonds and one of these in conjugation with the carbonyl group of the acid, such as sorbic acid, by following the normal practice of direct reaction with a polyhydric alcohol, the reaction is accompanied by one of polymerization at a rate such that premature gelling occurs to prevent a continuance of the ester formation. Moreover, so far as known, only the glycol sorbates of this group of esters have heretofore been obtained, and these only by resort to indirect methods that involve an intermediate step of chlorination; direct reaction, however, is preferred as it avoids the need of separating objectionable by-products and for corrosion-resistance reaction vessels.

It has now been discovered that, while factors which influence the rate of direct esterification— such as temperature, solvent control, reactant concentration, catalyst, speed of water removal and agitation—also affect the rate of polymerization, these factors do not operate to the same degree or in a like manner in the two reactions. With this discovery as a basis, it has been found possible to so select the conditions that substantially complete esterification can be had without interference by gelling due to polymerization. Polyhydric alcohol esters of conjugated double bond monoacids as defined above have as a result been successfully prepared by direct reaction. They are useful as substitutes for natural oils in coating and other compositions.

Among the controlling conditions, that of the temperature of the reaction appears fundamental, for with an increase in temperature the rate of polymerization has been found to increase faster than that of esterification; low temperatures are thus indicated for preferentially promoting esterification. On the other hand, the temperature must be sufficiently high to secure vaporization and removal of water as formed in order that the esterification may proceed. In general, it has been found that by holding the temperature below about 170° C. when other controlling factors are carefully observed, the esterification can be carried to a useful completion without interference by gelation; preferably, the reaction is continued only to a final refluxing temperature ranging from about 120° C. to 150° C. with the further advantage that discoloration is thereby avoided.

For holding the temperature within the desired range during the reaction, the presence of a substantially water-insoluble organic solvent that vaporizes at a reaction temperature within the above mentioned refluxing temperature range has been found convenient and effective in functioning as an agent both to slow the polymerization or gelation and to speed the esterification by increasing the rate of water take-off; in general the solvent forms an azeotropic mixture with the water. The proportion of solvent added does not appear critical, for as little as 5 per cent of solvent has been found sufficient when the other conditions are observed, and the smaller the amount of solvent, within limits of roughly 5-25 per cent, the faster is the esterification rate; but 25-75 per cent of solvent can be present in the reaction mass, and the esterification in general will still proceed to substantial completion without gelation; in this respect the dihydric alcohols, which possess lower functionality, permit wider latitude as to range of dilution than do the tri- and higher polyhydric alcohols. For the purpose solvents found particularly suitable are the hydrocarbon thinners, such as benzene, ethyl benzene, toluene, xylene, etc., "Solvesso," "Hexone," o-bromtoluene, diisobutyl ketone, dichloroethyl ether, and the like.

It has also been found essential to the preferential promotion of esterification over polymerization that an agent having a strong promoting action in the organic solvent medium be present as a catalyst; the order of strength is determined by the relative speeds of the ester-forming reaction. Particularly useful as strong condensing agents are the mineral acids that in the order of decreasing strength appear to be perchloric, sulfuric, hydrochloric, nitric, etc.; of these sulfuric acid is preferred for availability and the high order of strength that promotes a substantial completion of the esterification in the preferred temperature range without objectionable gelling in as little as 5 per cent of solvent, such as xylene or toluene. The sulfonic acids, such as benzene- and toluene-sulfonic acids, operate as strong acids though not as effectively as the mineral acids listed in securing a substantial completion of the esterification without the initiation of an inhibiting gelation. Electrophilic halides, such as boron trichloride, aluminum chloride, zinc chloride, and particularly boron trifluoride, likewise act as strong acids in catalyzing the condensation reaction (Physical Organic Chemistry, 1940, by Hammett, page 261). When sulfuric acid is used, the catalyst is added in about 1.5 to 2 per cent concentration based on the weight of the reactants, though from 0.3 to 3.0 per cent can be employed with good effect; the other acids and the halides operating as acids are used in equivalent proportions in inverse ratio to their order of strength.

Inhibitors of polymerization are helpful, though no inhibitor has been found that permits esterification to continue to completion in the absence of solvent control; inhibitors are further useful for improving storage stability of the ester products. Sulfur has been found particularly efficient in amounts of from about 0.1 per cent to 0.5 per cent based on the weight of reactants and especially when used in conjunction with sulfuric acid as the catalyst; but selenium, hydroquinone and other known inhibitors can be used.

Polyhydric alcohols to form the esters include alkylene glycols and polyglycols, glycerols and polyglycerols, erythritol and pentaerythritol and their polymers, sorbitol, mannitol, trimethylolpropane, polyhydroxyethyl-benzenes, etc.; the foregoing can be seen to be primarily alcohols consisting of linked hydrocarbons having hydroxyl replacements for hydrogen atoms on different carbon atoms, though in polymerized form they may take on an ether structure as a result of condensation and dehydration. Normally the alcohol is present in excess of stoichiometric proportions.

The diene monoacids for preparing the esters, to which this invention is directed, are aliphatic acids having ethylenic bonds in conjugation and one of these bonds in conjugation with the carbonyl group; they comprise those acids having a straight chain skeletal structure

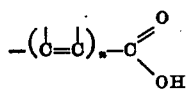

wherein $n$ is 2 to 4, and those acids having a cross-conjugate chain skeletal structure

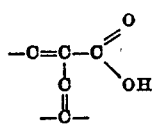

wherein the indicated free valencies are satisfied by hydrogen, alkyl, alkenyl or aryl groups. In addition to sorbic acid, straight chain acids of primary interest include $\beta$-vinyl-acrylic, octatrien-(2,4,6)-oic, decatetraen-(2,4,6,8)-oic, and $\beta$-styryl-acrylic; but $\alpha$-methyl-sorbic, $\alpha$-ethyl-sorbic, $\gamma$-$\epsilon$-dimethyl-sorbic, $\beta$-$\delta$-dimethyl-sorbic, $\alpha$-methyl-$\gamma$-benzal-crotonic, $\alpha$-ethyl-$\delta$-phenyl-$\alpha$-$\gamma$-butadiene-$\alpha$-carboxylic, 2,6-dimethyl-decatrien-(2,6,8)-oic-(10), etc., likewise form esters as herein disclosed. Examples of the cross-conjugate acids are $\alpha$-$\beta$-isopropylidene-propionic, $\alpha$-vinyl-cinnamic, $\alpha$-isopropenyl-cinnamic, $\alpha$-isopropenyl-furfural-acetic, $\alpha$-isopropenyl-cinnamenylacrylic, etc.

An unsaturated straight chain acid corresponding to the foregoing, can be prepared by the addition of ketene to a carbonyl compound, such as an unsaturated aldehyde or ketone that, in other words, has the structure

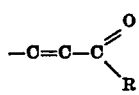

where R is either hydrogen or a hydrocarbon radical at low temperature in the presence of an organic solvent and a Friedel-Crafts type of catalyst, particularly boron trifluoride, yielding an unstable $\beta$-lactone that apparently tends to rearrange to a more stable $\gamma$- or $\delta$-lactone or to polymerize (according to U. S. patent to Boese 2,382,464, August 14, 1945); for preparing a cross-conjugated acid, ketene substituted by an unsaturated grouping can be reacted with a ketone or aldehyde (saturated or unsaturated). Hydrolysis (refluxing in caustic soda solution) and dehydration (with a dehydrating catalyst as sulfuric acid) or pyrolysis of polymeric lactone yields the $\alpha,\beta$ unsaturated acid of which the lactone is the inner ester of the corresponding hydroxy acid (U. S. patents to Kung 2,356,459, August 22, 1944 and 2,361,036, October 24, 1944); the other ethylenic bonds of the unsaturated acid sought are supplied by corresponding radicals on either the ketene or carbonyl compound or both, such radicals being the alkyl, alkenyl, aralkyl and aryl groups.

The isolation of the acid from the intermediate and its purification, however, is not readily accomplished. According to Kung (2,361,036, third paragraph) hydrolysis and dehydration do not give good yields because of the instability of a lactone and inability to dehydrate adequately; and the isolation and subsequent polymerization of the monomeric lactone as suggested by Kung (2,356,459) places a limitation on the original reactants and reacting conditions. In any case there is involved the separation of the acid that on account of its unsaturation tends to form resinous or other by-products if its distillation or fractionation is attempted.

It has been proposed to isolate the unsaturated acid obtained in the addition of a ketene to a carbonyl compound by esterifying the acid with a monohydric alcohol, distilling off the ester and then freeing the acid by saponification; so long as the ester is of a volatile or distillable character, such a process can be practiced, though it is relatively expensive and tedious. Polyhydric alcohol esters, however, do not lend themselves to separation from the non-volatiles by distillation, and it has accordingly appeared necessary to isolate the acids first before proceeding with the esterification. Most surprising, therefore, it has now been found that, when the intermediate is reacted in place of the acid with a polyhydric alcohol in a solvent and in the presence of a strong acid catalyst in accordance with this invention, a reaction occurs in which the intermediate evidently opens and rearranges to the unsaturated acid, and under the conditions, resinification or polymerization is sufficiently inhibited to yield an ester product that can then be separated by neutralizing, washing and drying similar to the ester prepared from the isolated acid. This procedure greatly reduces the cost as well as simplifies the procedure by the omission of the steps of isolating and purifying the acid to yield a synthetic, unsaturated oil.

The following examples are illustrative of without limiting the invention thereto.

Example 1

|  | Grams |
|---|---|
| Diethylene glycol | 175 |
| Sorbic acid | 336 |
| Xylene | 900 |
| Sulfuric acid (conc. 95.5%) | 8 |
| Sulfur (inhibitor) | 1.5 |

The mixture was charged into a vessel, agitated and heated to reflux under an atmosphere of carbon dioxide; the vapors were condensed in a trap designed to return the upper hydrocarbon layer to the reaction vessel and to permit withdrawal of the water layer. The mass was maintained at reflux temperature to about 146°–147°

C. for 11.5 hours or until water ceased to come off. It was cooled and slowly agitated while adding 100 grams of a solution prepared from

| | Grams |
|---|---|
| Sodium chloride | 75 |
| Anhydrous sodium carbonate | 35 |
| Distilled water | 300 |
| Ethanol (95%) | 70 |

After agitating for 20 minutes, the solution was allowed to separate into layers; the lower layer was drawn off, and the upper layer was dried with calcium chloride and filtered. The final acid number of the non-volatile was 0.56 and the esterification was 98.3 per cent complete and the product was a clear amber in color.

Example 2

| | Grams |
|---|---|
| Ethylene glycol | 105 |
| Sorbic acid | 336 |
| Xylene | 900 |
| Sulfuric acid (conc.) | 8 |
| Sulfur | 1.5 |

The charge was agitated while maintaining an atmosphere of carbon dioxide, and the reaction conducted at reflux temperature not exceeding 146°–147° C. with separation of water as in the foregoing example. After 12 hours the water ceased to come off, and the esterification to glycol disorbate was found to be 93.2 per cent complete. The product was washed as before, and its acid number after drying and filtering was 1.66.

Example 3

| | Grams |
|---|---|
| 1,3 dihydroxypropane | 125.4 |
| Sorbic acid | 336 |
| Xylene | 922.8 |
| p-Toluene sulfonic acid | 10 |
| Sulfur | 1.5 |

The charge was heated to reflux under a blanket of carbon dioxide, and the water of esterification was separated; after 6 hours 69.6 per cent of the sorbic acid had esterified. To hasten the reaction there was added 5 grams of concentrated sulfuric acid; after an additional 5 hours of refluxing to a temperature of 146°–147° C. the esterification was 88.5 per cent complete. The excess acid was neutralized by washing as before with a solution of sodium chloride, anhydrous sodium carbonate, water and alcohol, the aqueous layer was separated, and the hydrocarbon layer dried over anhydrous calcium chloride and filtered. The final yield of disorbate of 1,3-dihydroxy propane was 84.1 per cent with an acid number of 4.92.

Example 4

| | Grams |
|---|---|
| Sorbic acid | 1,282 |
| Glycerol (98%) | 397 |
| Toluene | 422 |
| Sulfuric acid (conc.) | 13.7 |
| Water | 27.4 |

The sorbic acid, glycerol and toluene were charged into a flask provided with an agitator, a $CO_2$ inlet, thermometer and water separator. While blowing with $CO_2$ the mass was heated to 105° C. and the solution of sulfuric acid in water was slowly added with agitation. Heating was continued at reflux temperature and the water driven off was separated. After 4 hours' heating to a final reflux temperature of 136° C., the esterification to glycerol trisorbate was 93.5 per cent complete as determined by the acid number after making allowance for the acid number attributable to the sulfuric acid; continuing the reaction for a total of about 6 hours gave 96–99 per cent esterification without gelation. The batch was thinned with toluene, and anhydrous sodium carbonate was added to neutralize the acid whereupon the solution was agitated and filtered. The batch, thinned with solvent to about 60 per cent non-volatile, had a final acid number of 21.8 on the non-volatile and a color of 10+ on the Gardner scale.

Example 5

| | | |
|---|---|---|
| Sorbic acid | grams | 840 |
| Pentaerythritol | do | 285 |
| Toluene | do | 281 |
| Sulfur | do | 383 |
| Sulfuric acid | do | 20.25 |
| Methanol | milliliters | 80 |

A charge of the sorbic acid, alcohol, solvent and sulfur was brought to 100° C. while blowing with carbon dioxide, and the sulfuric acid in the methanol was slowly added. The mass was heated to reflux and held for 4 hours to a temperature of 136° C. while removing the water of esterification; at this point the reaction was 84.1 per cent complete, and it was discontinued by diluting with 600 grams of xylene. The mass was washed with a sodium carbonate-sodium chloride-water solution, the aqueous layer separated, and the hydrocarbon layer filtered and dried.

Example 6

| | | |
|---|---|---|
| Sorbic acid | grams | 336 |
| Glycerol (98%) | do | 103.4 |
| Toluene | do | 100 |
| Boron trifluoride-ether complex | cc | 19[1] |

[1] Approximately 0.9% $BF_3$ on sorbic-glycerol reactants.

The mass was refluxed in an atmosphere of $CO_2$ using agitation and a trap separating water and hydrocarbon and designed to return the hydrocarbon to the reaction vessel. After 2.5 hours of refluxing the esterification was 98 per cent complete and the end refluxing temperature was about 136° C. The mass was diluted to 50 per cent non-volatile with more toluene, cooled and filtered. A pale yellow solution resulted which was lighter in color than a similar batch prepared with $H_2SO_4$ as the catalyst.

The foregoing examples are directed to sorbic acid; but the other diene monoacids comprehended by this invention behave in the same manner to form esters. This is demonstrated by the following example to octatrienoic acid.

Example 7

| | Grams |
|---|---|
| Octatrienoic acid | 414 |
| Glycerol (98%) | 103 |
| Toluene | 130 |
| Sulfuric acid (95.5%) | 7.7 |
| Methanol | 7.7 |

Using the same equipment and following the same procedure as before, the charge of acid, glycerol and solvent had slowly added thereto the sulfuric acid catalyst in methanol whereupon heat was applied to the refluxing temperature. Heating was continued for 6 hours with removal of water of esterification and return of hydrocarbon at the refluxing temperature of about 136° C. At the end of the period the esterification was 91 per cent complete. As before the mass was diluted with toluene to 50 per cent non-volatile, neutralized with dry sodium carbonate and filtered. The final ester solution was brown in color.

Illustrative of the replacement of the acid by the corresponding intermediate resulting from the reaction of a ketene and a carbonyl compound are the following examples.

Example 8

| | |
|---|---|
| Crude sorbic intermediate (75% available as sorbic acid) _____grams__ | 554 |
| Ethylene glycol _____do____ | [1]83 |
| Xylene _____do____ | 345 |
| Sulfuric acid (95.5%) _____do____ | 6.15 |
| Sulfur _____do____ | 1.15 |
| Methanol _____cubic centimeters__ | 25 |

[1] 15% excess.

The crude sorbic intermediate was obtained by passing at about 5°–10° C. equimolecular proportions of crotonaldehyde (R.CHO wherein R is the propenyl radical $CH_3$—$CH$=$CH$—) and ketene ($CH_2$=$CO$) through toluene with boron trifluoride as the catalyst; upon stripping the solvent a black viscous residue remained.

The residue was mixed with the glycol and the organic solvent, and heat and agitation were applied under at atmosphere of $CO_2$. The catalyst in methanol solution together with the inhibitor were slowly added at about 94° C. The mass was maintained at reflux temperature for approximately 4 hours during which time the final temperature reached was 151° C. and the esterification was about 70 per cent complete. The mass was cooled and washed with sodium carbonate-salt-water to remove any free acid. After separation of the water layer, the mass was dehydrated over calcium chloride and filtered. The final ester solution was dark amber in color and free from resin and gel products.

The esterifying process is thus a self-clarifying one as well as one that eliminates the necessity of the isolation of either the lactone from the intermediate or the unsaturated acid before reacting with the alcohol. It thus affords a cheap method of preparing a synthetic oil with drying or polymerizing properties and having particular utility in the preparation of oil-modified resinous compositions for molding into brake linings, insulation, etc., and for coatings where color is not objectionable.

Example 9

A lactone, identified as 3-methyl-hexenolide (1,4) was prepared along with 3-methyl-hexenolide (1,5) by reacting ethylidene acetone with ketene. The hexenolides were separated, and the hexenolide (1,4) having the structure

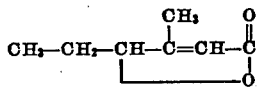

was used in this example; this lactone opens to produce 3-methl-sorbic acid. The equipment and processing was as before with a charge of

| | Grams |
|---|---|
| 3-methyl-hexenolide (1,4) _____ | 378 |
| Glycerol (95%) _____ | [1]106.5 |
| Toluene _____ | 121.1 |
| Sulfuric acid (95.5%) _____ | 7.3 |
| Methanol _____ | 7.3 |

[1] 10% excess.

The sulfuric acid in methanol was added to the mixture of the remaining ingredients heated to 95° C. The mass was refluxed with return of solvent. After 7 hours' refluxing the esterification was 84 per cent complete. The product was diluted with toluene to 50 per cent non-volatile, giving a dark brown solution.

Example 10

When the 3-methyl hexenolide (1,5) was substituted in Example 9 under identical conditions a product of surprisingly much lighter color and 90.6 per cent esterification resulted. This lactone has the structure

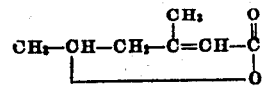

The triglycerides of 3-methyl-sorbic acid produced in Examples 9 and 10 were found to convert on heating to hard thermoset films much more slowly than straight glyceryl trisorbate. This is due to the decreased reactivity resulting from the replacement of hydrogen by a methyl group in the conjugated structure.

The limiting conditions necessary to esterification without undue inhibiting gelation were determined by an extended series of experiments varying the solvent and solvent proportions, catalyst, inhibitor and final reflux temperature that led to the conclusion herein expressed concerning these factors. In the course of the experiments it was noted that measuring the evolved water was an unreliable method for determining the extent of esterification; but the acid number determinations were in close agreement with the hydroxyl determinations, and the acid number was accordingly selected as an indicator of the extent of esterification.

The polyhydric alcohol sorbates and other esters of this invention are characterized by a very rapid drying in air and by producing extremely hard films that are water and alkali resistant. As an instance, a film of glyceryl trisorbate (Example 4) upon air-drying withstood 5 per cent caustic for 96 hours, and similar tests indicated excellent resistance to 5 per cent acetic acid solution and 3 per cent citric acid solution.

The esters have numerous applications, such as in wrinkle finishes; furniture finishes; blends with varnishes and oils to promote rapidity of drying and hardness; paper saturants; laminating and surface sheet materials; cloth sizing; and blends and hardeners for liquid polystyrene, nitrocellulose, vinyl chloride-vinyl acetate copolymers and their hydrolyzed products, polyvinyl butyral, alkyd resins, etc.

What is claimed is:

1. Process of preparing an ester of a polyhydric alcohol consisting of linked hydrocarbons having hydroxyl replacements for hydrogen atoms on different carbon atoms and an unsaturated monocarboxylic acid having conjugated ethylenic bonds and one of these bonds in conjugation with the acidic carbonyl which comprises directly reacting the acid with an excess over stoichiometric proportions of the alcohol in the presence of a strong acidic catalyst and in an organic solvent therefor at refluxing temperature not exceeding 170° C. to thereby yield esters characterized by drying to hard films.

2. Process of preparing an ester of a polyhydric alcohol consisting of linked hydrocarbons having hydroxyl replacements for hydrogen atoms on different carbon atoms and an unsaturated monocarboxylic acid having conjugated ethylenic bonds and one of these in conjugation with the acidic carbonyl which comprises directly reacting the acid with an excess over stoichiometric proportions of the alcohol in the presence of a strong acidic catalyst and in from 5 to 75 per cent by weight of the reactants of an organic solvent therefor at refluxing temperature not exceeding 170° C. to thereby yield esters characterized by drying to hard films.

3. Process of preparing an ester of a polyhydric alcohol consisting of linked hydrocarbons having hydroxyl replacements for hydrogen atoms on different carbon atoms and an unsaturated monocarboxylic acid having conjugated ethylenic bonds and one of these in conjugation with the acidic carbonyl which comprises directly reacting the acid with an excess over stoichiometric proportions of the alcohol in the presence of sulfuric acid and from 5 to 75 per cent by weight of the reactants of a hydrocarbon thinner at refluxing temperature not exceeding 170° C. to thereby yield esters characterized by drying to hard films.

4. Process of preparing an ester of a polyhydric alcohol consisting of linked hydrocarbons having hydroxyl replacements for hydrogen atoms on different carbon atoms and an unsaturated monocarboxylic acid having conjugated ethylenic bonds and one of these in conjugation with the acidic carbonyl which comprises directly reacting the acid with an excess over stoichiometric proportions of the alcohol in the presence of a strong acidic catalyst, of a polymerizing inhibitor and of from 5 to 75 per cent by weight of the reactants of an organic solvent therefor at refluxing temperature not exceeding 170° C. to thereby yield esters characterized by drying to hard films.

5. Process of preparing an ester of a polyhydric alcohol consisting of linked hydrocarbons having hydroxyl replacements for hydrogen atoms on different carbon atoms and an unsaturated monocarboxylic acid having conjugated ethylenic bonds and one of these in conjugation with the carbonyl which comprises directly reacting the acid with an excess over stoichiometric proportions of the alcohol in the presence of sulfuric acid, sulfur and of from 5 to 75 per cent by weight of the reactants of a hydrocarbon thinner at a refluxing temperature not exceeding 170° C. to thereby yield esters characterized by drying to hard films.

6. Process of preparing an ester of glycerol and sorbic acid which comprises directly reacting the acid with an excess over stiochiometric proportions of the glycerol in the presence of from 0.3 to 3.0 per cent sulfuric acid, of from 0.1 to 0.5 per cent sulfur and of from 5 to 25 per cent of a hydrocarbon thinner at a refluxing temperature ranging from about 120° to 150° C., the proportions being based on the weight of the reactants to thereby yield esters characterized by drying to hard films.

LEON SHECHTER.

REFERENCES CITED

The following references are of record in the file of this patent:

UNITED STATES PATENTS

| Number | Name | Date |
|---|---|---|
| 2,129,722 | Woodhouse | Sept. 13, 1938 |
| 2,376,704 | Kung | May 22, 1945 |
| 2,381,880 | Cupery | Aug. 14, 1945 |

FOREIGN PATENTS

| Number | Country | Date |
|---|---|---|
| 795,616 | France | Mar. 18, 1936 |